United States Patent
Dey et al.

(10) Patent No.: US 12,347,159 B2
(45) Date of Patent: Jul. 1, 2025

(54) SYSTEM AND METHOD FOR REAL-TIME RADAR-BASED ACTION RECOGNITION USING SPIKING NEURAL NETWORK(SNN)

(71) Applicant: Tata Consultancy Services Limited, Mumbai (IN)

(72) Inventors: Sounak Dey, Kolkata (IN); Arijit Mukherjee, Kolkata (IN); Dighanchal Banerjee, Kolkata (IN); Smriti Rani, Kolkata (IN); Arun George, Bangalore (IN); Tapas Chakravarty, Kolkata (IN); Arijit Chowdhury, Kolkata (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1100 days.

(21) Appl. No.: 17/122,041

(22) Filed: Dec. 15, 2020

(65) Prior Publication Data

US 2021/0365778 A1     Nov. 25, 2021

(30) Foreign Application Priority Data

May 22, 2020   (IN) .............................. 202021021689

(51) Int. Cl.
    *G06N 3/049*    (2023.01)
    *G01S 7/40*     (2006.01)
    (Continued)

(52) U.S. Cl.
    CPC .......... *G06V 10/454* (2022.01); *G01S 7/4056* (2013.01); *G01S 13/505* (2013.01);
    (Continued)

(58) Field of Classification Search
    CPC ...... G06V 10/454; G06V 10/82; G06V 40/20; G06V 30/19173; G01S 7/4056; G01S 13/505; G06N 3/049; G06N 3/08
    See application file for complete search history.

(56) References Cited

U.S. PATENT DOCUMENTS 9,714,797 B2   7/2017   Groot et al.

FOREIGN PATENT DOCUMENTS

| ES | 2600883 T3 | 2/2017 |
|----|------------|--------|
| WO | WO2019074532 A1 | 4/2019 |

OTHER PUBLICATIONS

Tavanaei et al., Deep Learning in Spiking Neural Networks, Jan 2019. (Year: 2019).*

(Continued)

*Primary Examiner* — Marshall L Werner
(74) *Attorney, Agent, or Firm* — Finnegan, Henderson, Farabow, Garrett & Dunner, LLP

(57) ABSTRACT

This disclosure relates generally to action recognition and more particularly to system and method for real-time radar-based action recognition. The classical machine learning techniques used for learning and inferring human actions from radar images are compute intensive, and require volumes of training data, making them unsuitable for deployment on network edge. The disclosed system utilizes neuromorphic computing and Spiking Neural Networks (SNN) to learn human actions from radar data captured by radar sensor(s). In an embodiment, the disclosed system includes a SNN model having a data pre-processing layer, Convolutional SNN layers and a Classifier layer. The preprocessing layer receives radar data including doppler frequencies reflected from the target and determines a binarized matrix. The CSNN layers extracts features (spatial and temporal) associated with the target's actions based on the binarized matrix. The classifier layer identifies a type of the action performed by the target based on the features.

9 Claims, 7 Drawing Sheets

(51) Int. Cl.
  *G01S 13/50* (2006.01)
  *G06N 3/08* (2023.01)
  *G06V 10/44* (2022.01)
  *G06V 10/82* (2022.01)
  *G06V 30/19* (2022.01)
  *G06V 40/20* (2022.01)

(52) U.S. Cl.
  CPC ............... *G06N 3/049* (2013.01); *G06N 3/08* (2013.01); *G06V 10/82* (2022.01); *G06V 30/19173* (2022.01); *G06V 40/20* (2022.01)

(56) References Cited

OTHER PUBLICATIONS

Qisong et al., Dynamic Hand Gesture Recognition Using FMCW Radar Sensor for Driving Assistance, 10th International Conference on Wireless Communications and Signal Processing (WCSP), Oct 2018. (Year: 2018).*

Zhang et al., Doppler-Radar Based Hand Gesture Recognition System Using Convolutional Neural Networks, Nov 2017. (Year: 2017).*

Cao et al., Spiking Deep Convolutional Neural Networks for Energy-Efficient Object Recognition, International Journal of Computer Vision, vol 115, pp. 54-66, Nov 2014. (Year: 2014).*

Kheradpisheh et al., STDP-Based Spiking Deep Convolutional Neural Networks for Object Recognition, Dec 2017. (Year: 2017).*

Escobar, Maria-Jose et al., "Action Recognition Using a Bio-Inspired Feedforward Spiking Network," International Journal of Computer Vision, May 2009, vol. 82(3), pp. 284-301, Publisher: Springer Science+Business Media, LLC 2009, Link: https://www.researchgate.net/publication/220660313_Action_Recognition_Using_a_Bio-Inspired_Feedforward_Spiking_Network/link/004635171548a09b94000000/download.

* cited by examiner

SYSTEM AND METHOD FOR REAL-TIME RADAR-BASED ACTION RECOGNITION USING SPIKING NEURAL NETWORK(SNN)

PRIORITY CLAIM

This U.S. patent application claims priority under 35 U.S.C. § 119 to: India Application No. 202021021689, filed on May 22, 2020. The entire contents of the aforementioned application are incorporated herein by reference.

TECHNICAL FIELD

The disclosure herein generally relates to action recognition, and, more particularly, to system and method for real-time radar-based action recognition using. Spiking neural network (SNN).

BACKGROUND

Action recognition refers to recognizing activities from a series of observations on actions of a target, for example a human or an object. Typically, action recognition techniques employ use of cameras and surveillance videos. Moreover, wearables such as inertial sensors are used to indirectly measure activities or gestures. The need for presence and action recognition in various applications such as for vision impaired individuals, elderly assistance and monitoring; and off-body detection scenarios such as defense, disaster and rescue operations has propelled interest in various other types of sensors such as PIR sensors, piezo sensors, radars and many more.

SUMMARY

Embodiments of the present disclosure present technological improvements as solutions to one or more of the above-mentioned technical problems recognized by the inventors in conventional systems. For example, in one embodiment, a method for real-time radar-based action recognition using SNN is provided. The method includes employing a Spiking neural network (SNN) model for recognition of an action performed by a target, the SNN model comprising a data pre-processing layer, a plurality of Convolutional Spiking neural network (CSNN) layers and a Classifier layer. Employing the SNN model for action recognition includes receiving, by the preprocessing layer, a radar data acquired by one or more radar sensors, the radar data indicative of one or more actions performed by a target, wherein the radar data comprises a plurality of doppler frequencies reflected from the target upon motion of the target with respect to the one or more radar sensors. Further the method includes determining, by the data preprocessing layer, a first binarized matrix associated with the radar data. Furthermore, the method includes extracting, by the plurality of CSNN layers pre-trained on a training data, a set of features associated with the one or more actions of the target based on the first binarized matrix, the set of features comprising a first set of spatial features and a first set of temporal features. Also, the method includes identifying, by the classifier layer, a type of the action from amongst the one or more actions performed by the target based on the set of features.

In another embodiment, a system for real-time radar-based action recognition using SNN is provided. The system includes one or more memories; and one or more hardware processors, the one or more memories coupled to the one or more hardware processors, wherein the one or more hardware processors are configured to execute programmed instructions stored in the one or more memories, to employ a Spiking neural network (SNN) model for recognition of an action performed by a target, the SNN model comprising a data pre-processing layer, a plurality of Convolutional Spiking neural network (CSNN) layers and a Classifier layer. To employ the SNN model for action recognition, the one or more hardware processors are configured by the instructions to receive, by the preprocessing layer, a radar data acquired by one or more radar sensors, the radar data indicative of one or more actions performed by a target, wherein the radar data comprises a plurality of doppler frequencies reflected from the target upon motion of the target with respect to the one or more radar sensors. Further, the one or more hardware processors are configured by the instructions to determine, by the data preprocessing layer, a first binarized matrix associated with the radar data. Also, the one or more hardware processors are configured by the instructions to extract, by the plurality of CSNN layers pre-trained on a training data, a set of features associated with the one or more actions of the target based on the first binarized matrix, the set of features comprising a first set of spatial features and a first set of temporal features. Moreover, the one or more hardware processors are configured by the instructions to identify, by the classifier layer, a type of the action from amongst the one or more actions performed by the target based on the set of features In yet another aspect, a non-transitory computer readable medium for a method for real-time radar-based action recognition using SNN is provided. The method includes employing a Spiking neural network (SNN) model for recognition of an action performed by a target, the SNN model comprising a data pre-processing layer, a plurality of Convolutional Spiking neural network (CSNN) layers and a Classifier layer. Employing the SNN model for action recognition includes receiving, by the data preprocessing layer, a radar data acquired by one or more radar sensors, the radar data indicative of one or more actions performed by a target, wherein the radar data comprises a plurality of doppler frequencies reflected from the target upon motion of the target with respect to the one or more radar sensors. Further the method includes determining, by the preprocessing layer, a first binarized matrix associated with the radar data. Furthermore, the method includes extracting, by the plurality of CSNN layers pre-trained on a training data, a set of features associated with the one or more actions of the target based on the first binarized matrix, the set of features comprising a first set of spatial features and a first set of temporal features. Also, the method includes identifying, by the classifier layer, a type of the action from amongst the one or more actions performed by the target based on the set of features.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
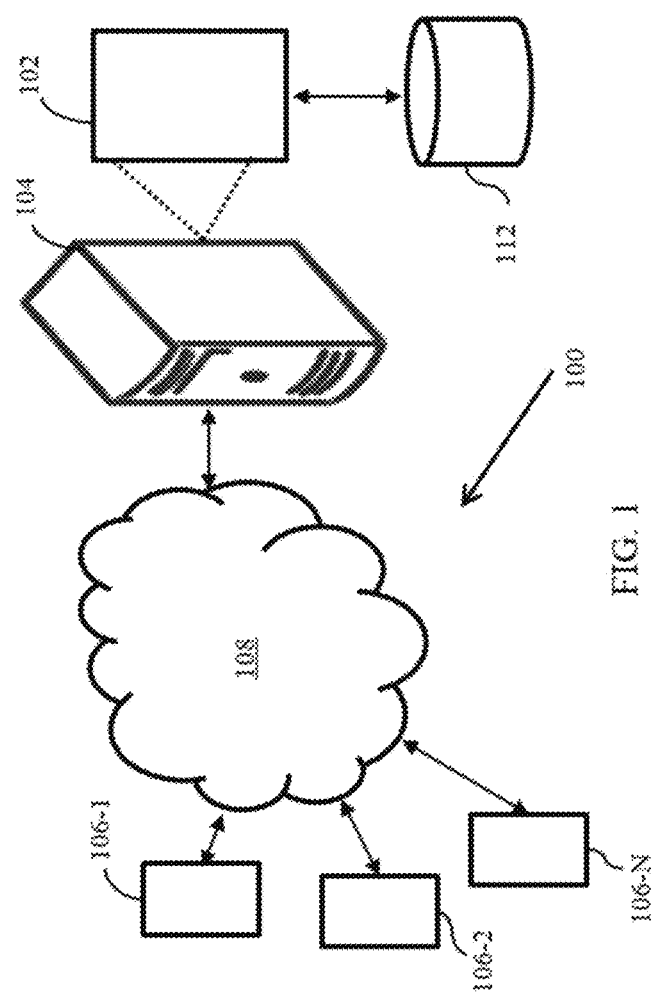
FIG. 1 illustrates an example network implementation of a system for real-time radar-based action recognition using SNN, in accordance with an example embodiment.

Radar-based human sensing is being utilized for unobtrusive detection of human physiology as well as recognizing gestures/activities. These radars are compact in size, affordable and can be easily integrated to remote monitoring systems. Using radar for human sensing has certain advantages over vision technologies in that this is privacy preserving, independent of lighting conditions, usually does not require background subtraction (static background is defined as 'Clutter' in radar terminology) and can be used for through-the-wall imaging. Amongst the radar technologies, 'Continuous Wave' (CW) or 'Frequency Modulated Continuous Wave' (FMCW) radars are preferred for short range (up to 15 meters) and indoor applications like elderly care. For CW radar, one measures motion directly in terms of Doppler frequency while for FMCW or Pulse radars, Doppler frequency is derived through pre-processing. It is to be noted that human movements constitute articulated motion vide linkages through flexible joints. When a rigid body moves in the field of view of the radar sensor, the return signal displays doppler frequency by taking the difference between transmitted and received frequencies. But when a person performs some action, even while standing still, the radar return displays time varying doppler frequency patterns. This is known as micro-Doppler effect. Thus, the radar signal is usually processed by generating spectrogram or joint time-frequency plots. The classification and detection of different actions from such radar signals is complex.

The signatures due to human motion displays complex pattern. In certain scenarios, machine learning techniques are applied for action detection. However, new insights are required for accurate and reliable detection of human gestures from radar returns. Conventionally, classical machine learning techniques, including Artificial Neural Networks (ANN) and Deep Learning models have been used on data from vision sensors for identifying actions. However, apart from the privacy concern, the classical approaches suffer from another great disadvantage in that the methods are not tailored for end-to-end execution on edge devices. In various industrial domains, such as Internet of Things (IoT), robotics, healthcare, retail etc., an abundance of low powered devices exists at the edge of the network and there is a drive to utilize the available compute cycles on such devices. The advantage this approach has over the prevailing methodology is that the data need not be sent upstream to the computing infrastructure over the network, thereby reducing the latency and communication cost. However, the classical approaches mentioned above require a large volume of data for training and are highly compute/memory intensive making them too heavy-weight for edge devices. Pre-trained compressed models can however be deployed on constrained devices—but that does not avoid the cost incurred during training, the requirement of a large volume of training data, and being compressed, they often sacrifice accuracy.

Recently, radar sensors are being explored for use in action recognition in various applications due to non-intrusive nature thereof. Examples of such applications ranges from rigid bodies like pendulum motion and rotating helicopter blades to nonrigid bodies like humans walking, bird flapping its wings, quadrupedal animal motion, detecting human activity and falls, and so on. Another conventional technique utilizes a deep learning network on the data collected from two pulse-Doppler RCRs to detect falls in elderly. Yet another known system utilizes unaided and aided activity recognition by utilizing radars and deep convolutional autoencoder. Google™ went ahead to develop 'Project Soli™', which identifies various finger-based gesture. Despite aforementioned techniques and systems, currently no single technique is agreed as a benchmark technique to handle radar signals for action recognition.

Various types of deep learning techniques have been applied to learn the human activities. The ability to learn visual patterns directly from the pixels without any pre-processing step makes the Convolutional Neural Network (CNN) suitable for learning human actions. For example, a conventional 3D CNN architecture applies multiple convolution at one pixel to identify different features at that position and using multiple channels to learn from different video frames. The final feature is generated as a combination of all those extracted features. Another conventional deep 3-D convolutional network (ConvNet™) tries to learn the spatio-temporal activity from a video. Yet another known methodology includes training a temporal ConvNet™ on optical flow instead of raw frames of a video. Still another known method utilizes the recurrent neural network for classifying the action sequences. Another known system utilizes the capability long-short term memory (LS™) cells to learn dynamics of the spatial features extracted by a convolutional neural network (CNN). Further, a known technique utilized a 3D-ConvNet™ to capture three-dimensional (3D) features and attached an LS™ network to capture the temporal pattern of those 3D filter features. Further known systems showed improvements by fusing different streams of features along with the aforementioned techniques and/or systems. As learning methods and inference frameworks of the conventional deep networks need large amount of training data and are typically computation intensive, these models are not the most efficient solutions.

The task of recognizing human actions using Spiking neural networks (SNNs) has been considered in various known systems. For example, a conventional system embodies a bio-inspired feed-forward spiking network for action recognition using mean firing rate of every neuron and synchrony between neuronal firing. However, this model does not take into account the property of action-selective neurons, which is essential for the decoding the observed pattern. Another known system uses a two-layer spiking neural network to learn human body movement using a gradient descent based learning mechanism by encoding the trajectories of the joints as spike trains. This inherently brings in the question of biological plausibility. Yet another known technique includes a Temporal Spiking Recurrent Neural Network (TSRNN) to perform robust action recognition from a video. The SNN model provides reliable and sparse frames to the recurrent units using a temporal pooling mechanism. Also, a continuous message passing from spiking signals to RNN helps the recurrent unit to retain its long-term memory. Still other technique includes capturing the temporal features of the input that are extracted by a recurrently connected network of spiking neurons, called the "liquid" or "reservoir", the output of which is trained to produce certain desired activity based on some learning rule. Using this idea of reservoir computing applied for reservoir creation, a "Driven/Autonomous" approach learnt video activity with limited examples. Even though driven/autonomous models are good for temporal dependency modelling of a single-dimensional pre-known time series but it cannot learn spatio-temporal features together needed for action recognition. A conventional system includes a deep architecture of a reservoir connected to an unsupervised Winner Take All (WTA) layer, that captures input in a higher dimensional space (by the reservoir) and encodes that to a low dimensional representation (by the WTA layer). All the information from the layers in the deep network are selectively processed by "attention based neural mechanism". They have used ANN-based spatial feature extraction using ResNet™ but it is compute intensive.

Various embodiments disclosed herein provides method and system for action recognition using neuromorphic computing and convolution based spiking neural network (CSNN) to learn target's actions from data captured by the radar sensors in a compute efficient manner. In an embodiment, the system obtains radar data associated with target's actions, preprocesses the radar data, and provide the processed radar data to the CSNN model. The CSSN model is trained to learn target's actions from the radar data. Herein, the radar data includes micro-Doppler data. The disclosed CSSN model is capable of learning spatial as well as temporal data from the radar data. Further, the use of neuromorphic and SNN concepts makes the disclosed model deployable over evolving neuromorphic edge devices thereby making the entire approach more efficient in terms of data, computation and energy consumption.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 9, where similar reference characters denote corresponding features consistently throughout the figures, there are shown preferred embodiments and these embodiments are described in the context of the following exemplary system and/or method.

FIG. 1 illustrates an example network implementation 100 of a system 102 for real-time radar-based action recognition using neuromorphic computing and SNN, in accordance with an example embodiment. The neuromorphic computing mimics mammalian sensing and data processing mechanism. In this form of computing architecture, memory is collocated with processor and the data flow is in the form of inherently sparse spike trains thus reducing computation cost and time. The architecture typically runs networks designed using spiking neurons which are energy efficient due to their sparse and asynchronous communication in form of spikes. Being energy efficient, the neuromorphic architecture is highly suitable for large-scale deployment as edge devices and hence, the neural network models designed to take advantage of the underlying neuromorphic hardware, have become prime candidates to run at the edge. The Spiking Neural Network (SNN) have the advantage of computational capabilities over conventional networks.

In an embodiment, the system 102 learns and identifies target's actions using the concept of neuromorphic computing applied over radar data (obtained from radar sensors monitoring the target). In an embodiment, the radar data facilitates in creation of micro-Doppler data which is then utilized for action recognition. The micro-Doppler data includes positive and negative doppler frequencies that are observed when different parts of the target move towards or away from the radar sensor. Together, all these frequencies constitute the micro-Doppler signatures for a particular action. Since different target parts move at different frequencies for multiple actions, their micro-Doppler signatures are different in time frequency domain. The system 102 employs a convolution-based spiking neural network (CSNN) that is capable of learning both spatial and temporal features of the actions. The CSNN is described further with reference to FIG. 3.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. The components and functionalities of the system 102 are described further in detail with reference to FIGS. 2-9.

Referring collectively to FIGS. 2-9, components and functionalities of the system 102 for target's action recognition using a SNN is described in accordance with an example embodiment. The disclosed embodiments relate to action recognition of a target using radar data.

At 202 of method 200, a Spiking neural network (SNN) model is employed for recognition of the action performed by the target. The SNN model includes a data pre-processing layer, a plurality of Convolutional Spiking neural network (CSNN) layers and a Classifier layer. A method of employing aforementioned layers of the SNN model along with architecture of the SNN model are described further by referring to steps 204-210 (FIG. 2) in conjunctions with FIG. 3.

Figure 2:
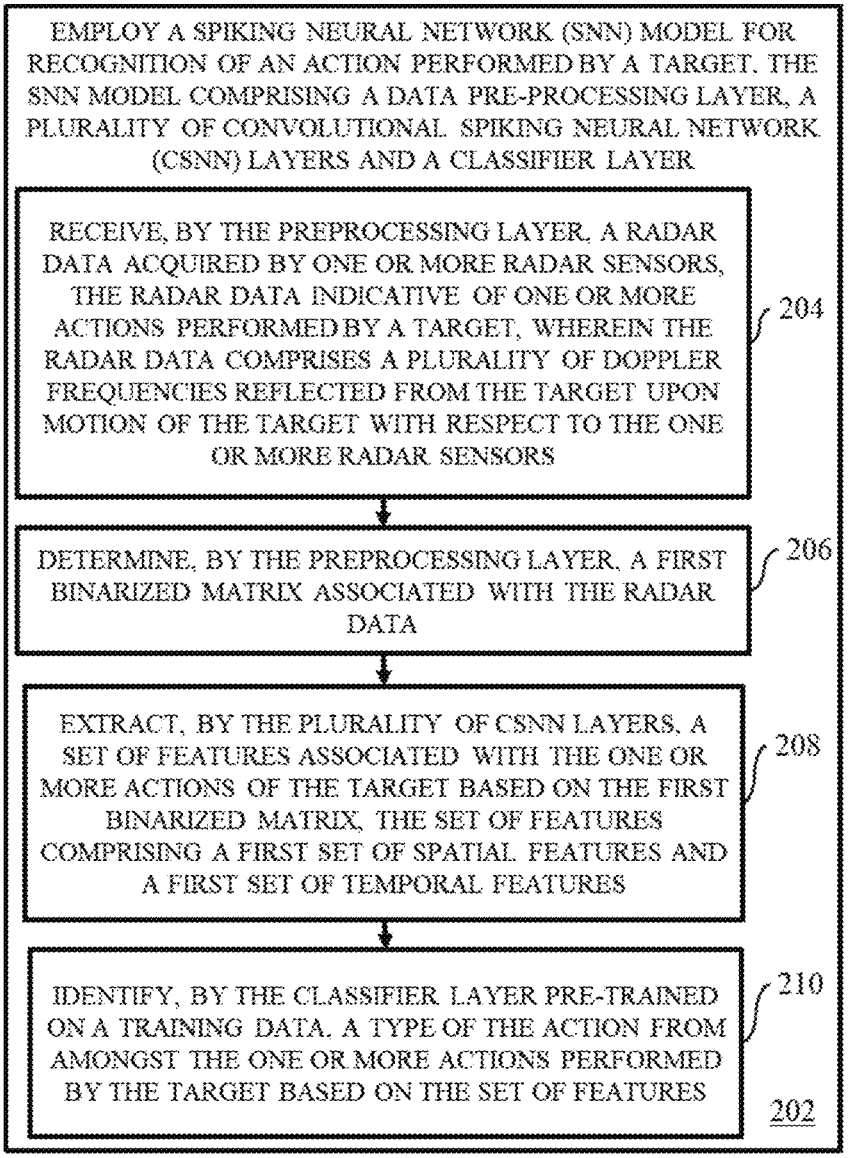
FIG. 2 is a flow diagram illustrating a method for real-time radar-based action recognition using SNN, in accordance with some embodiments of the present disclosure.
Figure 3:
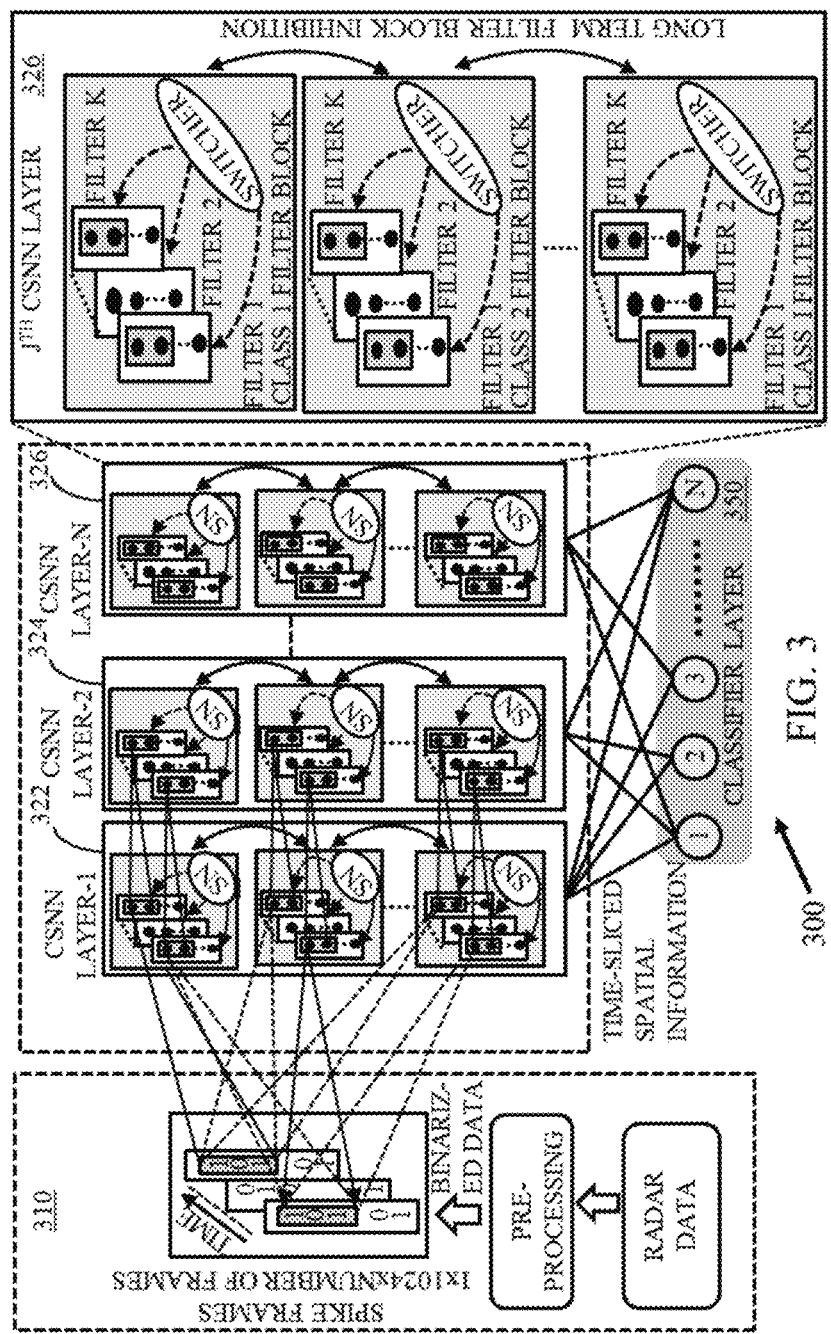
FIG. 3 is a functional block diagram of the SNN model for real-time radar-based action recognition in accordance with some embodiments of the present disclosure.

Referring to FIG. 3, a block diagram depicting architecture of the disclosed SNN model is illustrated in accordance with an example embodiment. As illustrated in FIG. 3, the SNN model 300 is shown to include a data pre-processing layer 310, a plurality of CSNN layers (such as CSNN layers 322, 324, 326) and a classifier layer 350. The data preprocessing layer 310 performs compression and encoding on the radar data in order to make the computation faster. The plurality of CSNN layers such as CSNN layers 322, 324, 326 contains multiple spiking layers to extract the spatial features from the input radar data (or spiking data). A special technique is detailed below that is used to capture the temporal signature of action while the radar data is being processed in the CSNN layer. The spatial feature extraction is hierarchical in nature, with initial layers (for example, the CSNN layer 322) capturing low level features like edges with complexity keep on increasing till the last/final layer (for example, the CSNN layer 326). In other words, convoluting over the plurality of CSNN layers increases complexity in the first set of spatial features from an initial CSNN layer to a last CSNN layer of the plurality of CSNN layers. The convolutional features of a CSNN layer along with it's temporal spiking signature become an enriched feature set and is then passed to the classifier layer 350 for finally recognizing the actions. The details of each of the aforementioned components is described further below with reference to steps 204-210 (FIG. 2).

At 204, the method 200 includes receiving, by the pre-processing layer 310, a radar data acquired by one or more radar sensors. As described, the radar data is indicative of one or more actions performed by a target. In an embodiment, the radar data includes a plurality of Doppler frequencies reflected from the target upon motion of the target with respect to the one or more radar sensors. In an embodiment, the target may be a human being. Alternately, the target can be any living subject or a non-living object that is capable of motion. For example, the target may include robots, drones, and so on. For the purpose of brevity of description, the targets' actions are explained by considering the example of a human subject. It should however be understood that the embodiments can be equally implemented to any target without limiting to a human target.

Referring to human action recognition, human motion shows complex patterns. For example, when a person walks, there are micro-motions like arm swing associated with the movement of the body. When electromagnetic wave is scattered from human bodies (under motion), the resultant signal displays both Doppler effect as well as modulation of Doppler frequency. While Doppler frequency arises due to the target, i.e. human body moving towards (or away) from the radar, micro-Doppler signatures are seen due to the micromotions. Doppler frequency is visible in the frequency domain of a signal. Distinct micro-Doppler effect for different kinds of movements is examined in the joint time and Doppler frequency domain of a signal.

In an embodiment, Spectrogram plots, which are intensity plots of STFT (Short Time Fourier Transform), are used to visualize Spectro-temporal plots from radar returns. These plots help in analyzing the change of frequency with time and thus characterize the unique micro-Doppler signatures of different activities performed by a human. The STFT of a time domain signal x(t) is given by equation:

$$X(t,\omega) = \int_{-\infty}^{\infty} x(t+\tau)\omega(\tau)\exp(-j\omega\tau)d\tau dx \quad (1)$$

where $\omega(\tau)$ is the selected time window. Magnitude squared of the STFT gives the spectrogram (SP), shown by equation (2).

$$X_{SP}(t,\omega) = |X(t,\omega)|^2 \quad (2)$$

Figure 4:
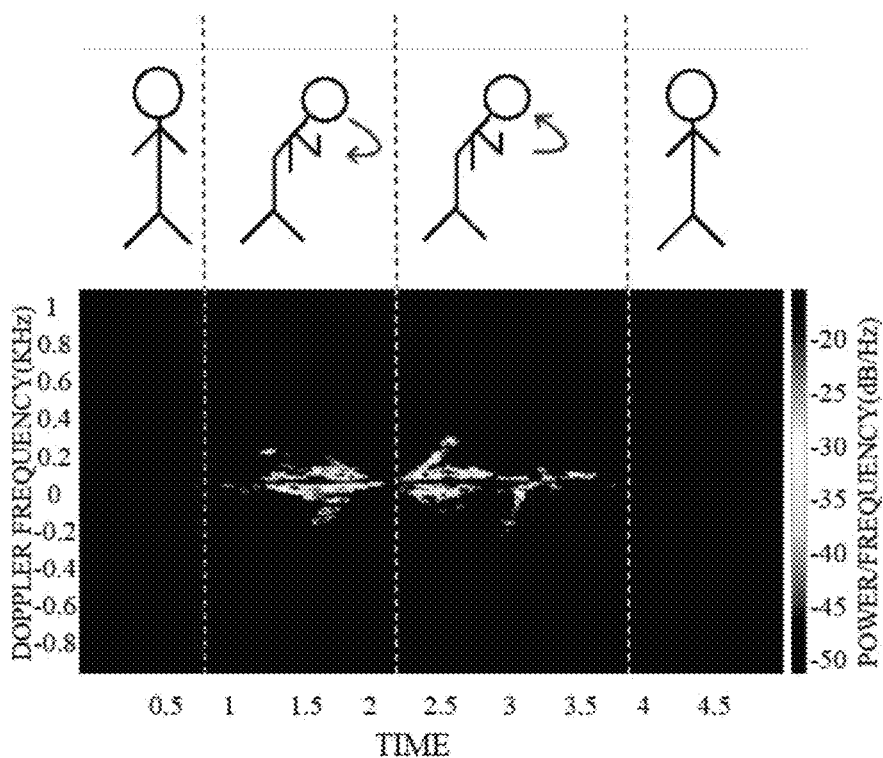
FIG. 4 illustrates a spectrogram for a bow action performed by a target (human), in accordance with an example embodiment of the present disclosure.
Figure 5:
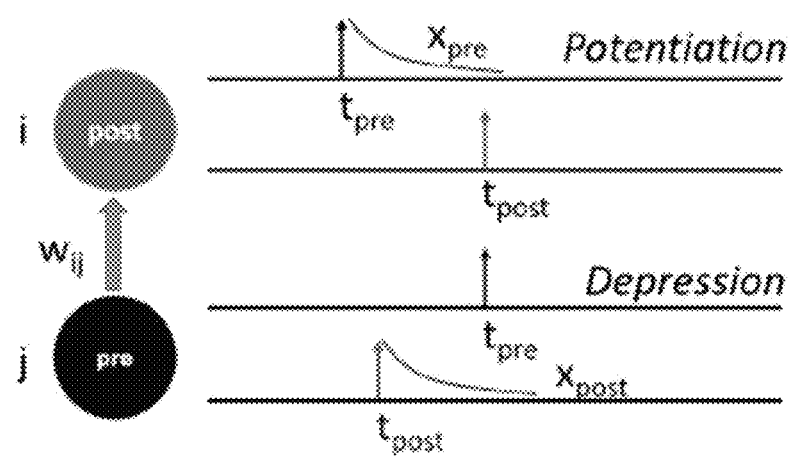
FIG. 5 illustrates a learning process of an arbitrary synapse for real-time radar-based action recognition in accordance with some embodiments of the present disclosure.

A narrow time window results in better resolution in time-axis, a poor one in frequency domain and vice versa. Thus, a unique trade-off point has to be achieved between time frequency resolution as both the information are important for the analysis of time-frequency plots. FIG. 4 shows a spectrogram for a bow action performed by a target (human). Zero Doppler frequency is observed when the person is still.

Positive and negative Doppler frequencies are observed when different body parts move towards or away from the radar sensor. Together, all these frequencies constitute the micro-Doppler signatures for a particular action. Since different body parts move at different frequencies for multiple actions, their micro-Doppler signatures are different in time frequency domain. Hereinafter, the micro-Doppler signatures or frequency signals obtained upon being reflected from the target upon motion of the target with respect to the one or more radar sensors may be referred to as training data. The data obtained from radar sensors during the training stage may be referred to as 'training data'. The data obtained from the radar sensors during the testing and/or validation phase may be referred to as 'radar data'. The training data obtained from the radar sensors may be utilized for training the SNN model. The training of the SNN model is explained by taking an analogy of human brain.

Mammalian brains are composed of hugely connected neurons and synapses which maintain a stability via mutual excitation and inhibition unless external stimuli affect the status-quo. When a neuron receives a stimulus, the membrane potential rises due to intra-cellular activity and inter-cellular activity, and if a threshold is breached, the neuron generates a spike (or a very quick surge of voltage) which is carried forward to the subsequent neuron via the synapse between the neurons. Spikes can assume the form bursts (repeated spikes within a short duration) or a single time event depending on the stimuli and the nature of the receiving neuron. Further, the biological features like composition of the synapse, the conductance of the cell body, and related chemical reactions play important roles in generation and processing of spikes. For the computation aspects and its adaptation in neural networks, the two most important factors are the rate at which spikes occur and the temporal relations of spike response between the pre- and postsynaptic neurons, i.e. whether the post-synaptic neuron fired after the pre-synaptic neuron the synaptic bond gets stronger and when whether the post-synaptic neuron fired before the pre-synaptic neuron then the causality relation breaks and the synaptic bond weakens.

Unlike classical ANNs, the SNNs use biologically plausible neuron models and are thus closer to mammalian brains. Spikes offer inherent sparsity and massively parallel asynchronous communication and resulting in spiking neuron models being energy efficient. However, ANNs operate on continuous valued input, whereas SNNs require the input data to be encoded in spike format for subsequent processing. SNNs are considered as the third generation of neural networks with formally proven computational capabilities comparable to that of regular ANNs.

In various embodiments, the Spiking Neuron can be mathematically modelled with different levels of complexity and granularity. Examples of spiking neuron model may include, but are not limited to, the Hodgkin-Huxley model, Leaky Integrate and Fire (LIF) model, and so on. An LIF, with a membrane potential V at any point in time, can be described by the differential equation (3):

$$\tau \frac{dV}{dt} = (V_{rest} - V) + g_e(E_{exc} - V) + g_i(E_{inh} - V) \quad (3)$$

To achieve stability, the membrane potential always tends to evolve towards the resting potential, $V_{rest}$. Hence, in the absence of any stimulus from pre-synaptic neurons, the membrane potential of a particular neuron remains at $V_{rest}$. Similarly, the equilibrium potentials of the excitatory and inhibitory synapses are represented by $E_{exc}$ and $E_{inh}$. Synapses are modelled as conductance values, namely, $g_e$, the excitatory conductance, and $g_i$, the inhibitory conductance. Excitatory pre-synaptic neurons increase the membrane potential, whereas, inhibitory pre-synaptic neurons tend to decrease it. As mentioned before, a spike is generated when the membrane potential breaches a threshold ($V_{thresh}$). A spike in the presynaptic neuron increases the conductance of the synapse in magnitude. The dynamics of excitatory and inhibitory conductance are modelled as per equations (4) and (5) respectively:

$$\tau_e \frac{dg_e}{dt} = -g_e \quad (4)$$

$$\tau_i \frac{dg_i}{dt} = -g_i \quad (5)$$

In an embodiment, a mathematical function used to model a spike may be Dirac Delta function. As this model is non-differentiable (which is logical for a spike which occurs at a time instance only), the gradient based learning algorithms popular in ANNs, cannot be applied in case of the SNN. Learning and memory in SNNs are thus modelled using Spike Time Dependent Plasticity (STDP) which takes into account the strengthening of synaptic bonds due to positive temporal correlation between pre- and post-synaptic spiking neurons. The STDP protocol modifies classical Hebbian learning rule by improving it with temporal asymmetry. A spiking neuron with STDP can learn a linear dynamical system with minimum least square error. A pre-synaptic trace, $x_{pre}$, for each synapse keeps track of the activity of the pre-synaptic neuron, and likewise a postsynaptic trace $x_{post}$, keeps track of the activity of the postsynaptic neuron. Each trace decays exponentially with time as shown in the equations (6) and (7) with synaptic trace decay constants $\tau_{pre}$ and $\tau_{post}$.

$$\tau_{pre} \frac{dx_{pre}}{dt} = -x_{pre} \quad (6)$$

$$\tau_{post} \frac{dx_{post}}{dt} = -x_{post} \quad (7)$$

At the occurrence of a spike at a pre- or post-synaptic neuron, the trace is incremented by a constant value a. For each pre-synaptic firing, the synaptic weight is reduced with a value proportional to the post-synaptic trace (the phenomenon is called depression) and for each post-synaptic firing, it is increased with a value proportional to the pre-synaptic trace (the phenomenon is called potentiation). The learning process of an arbitrary synapse is shown in FIG. 4.

The complete learning rule can be described by equations (8) and (9).

$$\Delta w_{dep} = \eta_{dep}(x_{post} \times s_{pre}) \quad (8)$$

$$\Delta w_{dep} = \eta_{pot}(x_{pre} \times s_{post}) \quad (9)$$

$S_{pre}$ and $S_{post}$ represent spike of the pre- and post-synaptic neurons, respectively. In practice, equations (8) and (9) are vector equations where $S_{pre}$ and $S_{post}$ denote the spike vectors of a population of neurons and is an outer product operation.

A biologically plausible approach adopted in neural networks in order to enhance competition between neurons is called Lateral Inhibition or Winner-Take-All. The first excited neuron to produce a spike attempts to stimulate other neurons or directly inhibits one or more of them. In a learning scenario, a pattern to be learnt excites one or more neurons, which in turn try to deactivate other neurons with the help of lateral inhibition, preventing them from learning the same pattern. In SNN networks, this mechanism helps multiple neurons to compete and learn different patterns. In the disclosed SNN model, a softer form of Lateral Inhibition like that of k-WTA is used, which is proven to be computationally less power intensive than a hard Lateral Inhibition and leads to better shared feature selectivity in cortical pyramidal cells.

The process of maintaining a stable internal state, prevalent in many biological systems (e.g. maintaining body temperature, pressure, blood sugar etc.) is known as homeostasis. In the context of SNNs, homeostasis of neuronal firing rate is meant to prevent the dominating effect of any particular neuron. In the present embodiment, a rate homeostasis is employed, where threshold of neuronal firing is adapted so that continuous firing by the same neuron can be discouraged.

In the present embodiment, the membrane threshold, $V_{thresh}$ is a combination of a static threshold value, $V_{thresh\text{-}static}$ and a dynamic memory based component, which increases with each firing by a constant value and decays exponentially with time. The complete spiking mechanism is described by equations below:

$$S(t) = \begin{cases} 1, & V(T) > V_{thresh} \\ 0, & V(T) \geq V_{thresh} \end{cases} \quad (10)$$

$$V_{thresh} = V_{thresh\text{-}static} + \theta(t) \quad (11)$$

$$\theta(t+1) = \begin{cases} \theta(t) + C, & S(t) = 1 \\ \theta(t), & S(t) = 0 \end{cases} \quad (12)$$

$$\tau_\theta \frac{d\theta}{dt} = -\theta \quad (13)$$

The aforementioned SNN model 300 is implemented by the system 102 (FIG. 1) for target action recognition. For example, at 204, the preprocessing layer receives a radar data acquired by one or more radar sensors. The radar data is indicative of one or more actions performed by a target. The radar data includes a plurality of doppler frequencies reflected from the target upon motion of the target with respect to the one or more radar sensors. At 206, the preprocessing layer 310 determines a first binarized matrix associated with the radar data. The determination of the first binarized matrix is described further in detail with reference to FIG. 6.

Figure 6:
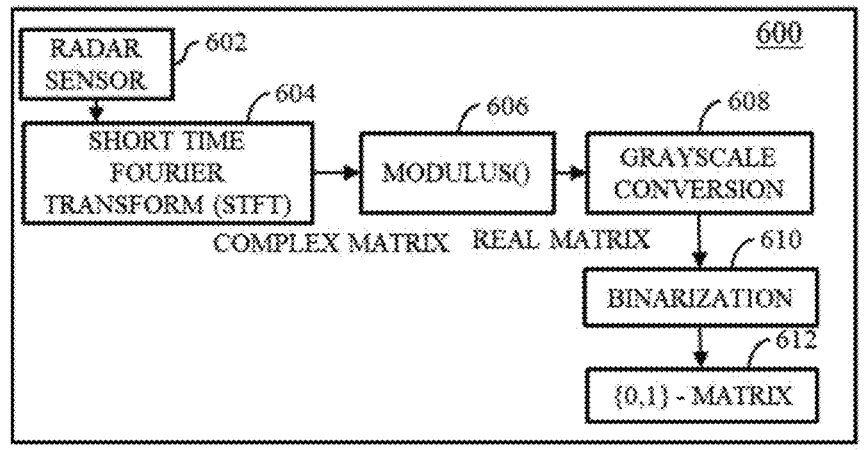
FIG. 6 illustrates a flow diagram for determination of a first binarized matrix for real-time radar-based action recognition action in accordance with some embodiments of the present disclosure.
Figure 7:
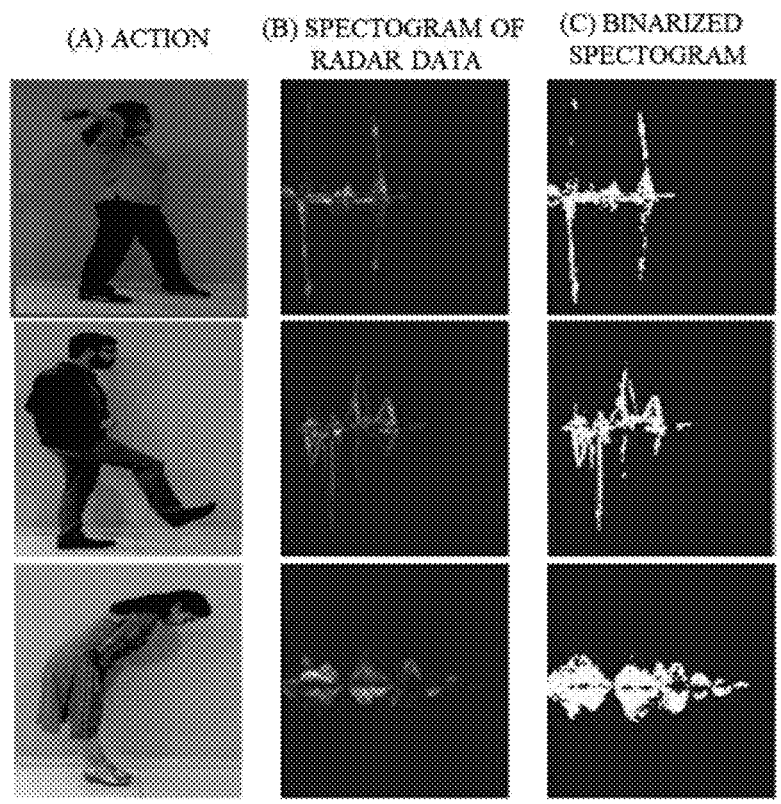
FIG. 7 illustrates visualization of data at pre-processing stage for (a) Throw action (b) Kick action (c) Bow action in accordance with some embodiments of the present disclosure.

As illustrated in FIG. 6, the method 600 for determination of the first binarized matrix includes receiving the radar data from the radar sensors at 602. Multiple spectrograms for the plurality of actions are determined as a time-frequency domain representation of the time series by using a STFT model at 604. In the example scenario, a 24 GHz Continuous Wave (CW) radar was used with I(in-phase) and Q(quadrature i.e. shifted by 90 degrees) channels at a sampling frequency of 2 KHz. Data was collected for 5 seconds for all actions. Thus, for each activity/action, quadrature time domain data of length 10000 was obtained. From the dataset, spectrogram for each action was computed, which is a time-frequency domain representation of the time series data obtained from radar. In the present scenario, 1024 point Fast Fourier Transform (FFT) with a 256 length Kaiser window with 75% overlap was used to compute the spectrogram. The number of time bins for a spectrogram is calculated by the formula in equation (14).

$$T(no.\ of\ time\ bins) = \frac{N - W_{overlap}}{W_{length} - W_{overlap}} \quad (14)$$

where N is the total sample data (5×2000), $W_{length}$ is the window length used for STFT computation(256) and $W_{overlap}$ is the overlapping number of data points (75% of 256=192). Thus, 153 time bins (T=153) are obtained. (±1 KHz) 2000 Hz data is represented by 1024 data points (owing to 1024 point FFT).

Hence, Frequency Resolution=2000=1024 Hz=1:953 Hz
A 5 second data have 153 samples leading to time resolution,
5/153 s=32:68 ms Thus, from 2-D radar data (I and Q channel), a time frequency data in −1 KHz to 1 KHz range for 5 seconds is obtained and this led to time-frequency dataset of 1024×153 size matrix (representing spectrogram).

A modulus operation is performed on the STFT model to obtain a real valued matrix at 606. Consecutively the real valued matrix is converted into a grayscale image at 608 and further, by binarization at 610 into a first binary matrix using a threshold at 612. As shown in FIG. 6, time domain data from the two channels is converted into Time-Frequency domain using STFT(eq 1). STFT provides a complex matrix. Modulus operation is performed on this STFT matrix to obtain a real valued matrix. A binary matrix, for example, the first binary matrix, is obtained by consecutively converting this real matrix into a grayscale image and later into a binary matrix using appropriate threshold. This binary matrix is the input to the spiking neural network where each column becomes an input at i-th instance of time, i=1 . . . T. Thus, input to the network is a 1-D binary image (aka vector). Spectrogram and the corresponding binarized images for three different actions (activities)—Throw, Kick and Bow respectively are depicted in three rows of FIG. 7.

Using the first binarized matrix, a set of features is extracted. For example at 208 (FIG. 2), the plurality of CSNN layers extracts a set of features associated with the one or more actions of the target based on the first binarized matrix. The set of features includes a first set of spatial features and a first set of temporal features. Herein, each of the plurality of CSNN layers includes a set of class-wise filter blocks with lateral inhibition with competition mechanism make up the Convolutional Spiking layer which takes in preprocessed data as input. In an embodiment, the network may consist of multiple such CSNN layers following a CNN-like connectivity between consecutive layers. Every spike-frame of an action sequence is connected to the convolutional layers via a sliding window of an initial dimension of w×h pixels (w=1 in this case), with each pixel being connected to a single neuron of the filter-block of the first convolutional layer. The window is slid vertically by a stride (s) to connect each pixel of the new window to the second neuron. The process is repeated till every pixel within the spike-frame is connected to the neurons in the filter.

Similar connections are made for further input spike-frames to the neurons within the same filter. Once the input frames are connected to the first or initial CSNN layer, consecutive layers can be connected in a similar fashion. The number of layers depends on the complexity of the spatial features of the dataset and hence remains a design choice. In order to enable the CSNN layers to capture spatially collocated patterns within the same spike frame of a single action class, multiple filters are created within each filter block which are connected via a switcher node, which in fact is a special LIF neuron, thereby avoiding learning 3D spatiotemporal filters from consecutive spike frames by activating only one filter at a given time. The switcher applies inhibition to force all but one filter in the block to inactive state, the duration of which depends on the strength of inhibition, which is a configurable parameter. After the period of inactivity, all filters start competing again and the one which causes the maximum spike is considered as the winner—which is an effective way of utilizing the 'winner takes all' concept explained previously. The process repeats depending on the decay time constant during the training time of the convolutional filters. That all filters get a chance during the training phase is ensured by the switching mechanism, and this also ensures that spatially collocated but temporally separable features appear on different filters.

To guarantee activation of only one filter block at a given point of time for a given action frame sequence, the system applies another level of long-term inhibition which additionally ensures that multiple filter blocks are not trying to learn the same redundant pattern. Instead, the lateral inhibition among filter blocks allows them to compete for action classes. The weights in the filter blocks may be initialized randomly and one block wins for the first time for a particular action class. This win ensures that the filter block provides the maximum spike only for that particular class during further training. Once a filter block wins due to maximum initial spiking, an inhibition signal of higher strength is sent to other filter blocks preventing them from being activated.

The filter-block-wise inhibition mechanism provides two distinct advantages: (i) Since all the filter blocks are not active at a given time, the number of active convolutional neurons of a CSNN layer during training time for each action is reduced. (ii) It allows for setting different periodicity (i.e. different decay time constant) for switcher nodes of different filter blocks according to its associated action. Switching periodicity is dependent on the total duration of the action and different spatial patterns present therein. If multiple repetitive patterns occur within a short duration, switching periodicity for that particular filter block can be set to a small value. During testing time, both long term inhibition between filter block as well as switching of filters within a block are removed as they are useful during training only.

Temporal features are extremely important for action recognition as these enable the system to capture the sequence of events by which a particular action is performed. This is especially useful for the cases where actions are spatially overlapping (for e.g. doing sit-up and jumping, right hand clockwise rotation and anticlockwise rotation etc.) but temporal sequence of events within the actions are different. The radar signature of whole action looks very similar for those spatially overlapping actions and spatial features as extracted by above CSNN layer would not be sufficient to accurately classify them.

Figure 8:
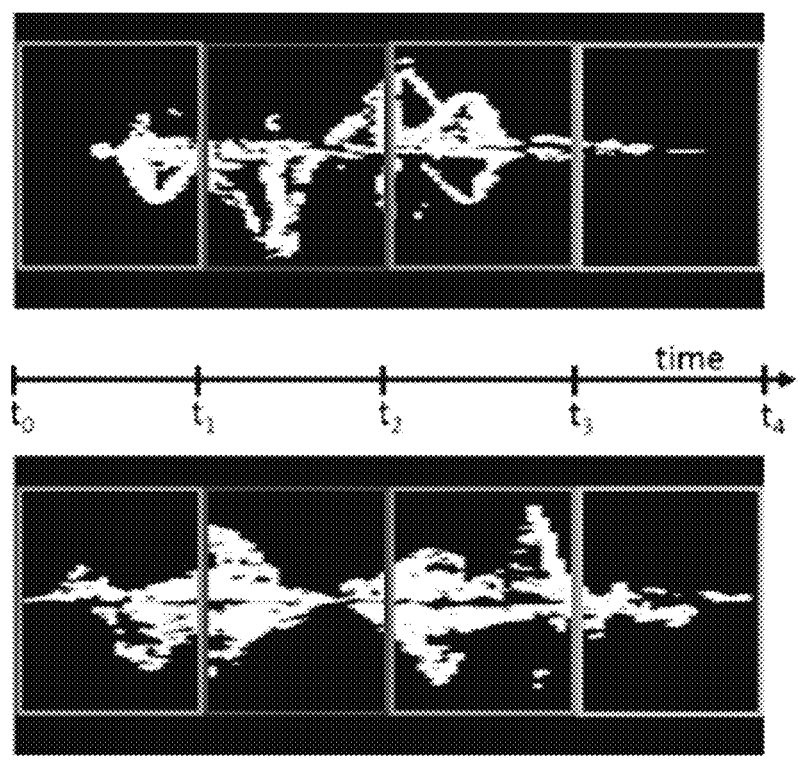
FIG. 8 illustrates an example of time window based temporal feature extraction for real-time radar-based action recognition action in accordance with some embodiments of the present disclosure.

In spiking domain, events are usually characterized by the timing of spike and by the number of spikes caused by an event. For spatially overlapping actions, the total number of spikes for two such actions may be nearly same and hence cannot be used for identifying the classes distinctly. Instead if the entire action sequence is divided into multiple equal sized time-windows and if one logs the individual spike-count during each such time-window then chances are more that the count may be different for same time-window of two spatially overlapping actions. For example, actions such as Sit-up and Jump are spatially overlapping actions and when their binarized spectrograms are fed into the network, they create almost same number spikes (6253 & 6479). As shown in FIG. 8, if binarized spectrograms of Sit up (top) and Jump (bottom) are divided into 4 equal time windows, then spike count of each time window for those two classes are found to be different. In the present case, all the action classes are of same time duration (i.e. 5 seconds) and the duration of each action is sliced into equal sized time-windows. These time-window-wise spike counts which capture the temporal signature of the action were used (along with spatial features) for classification in the classifier layer 350.

At 210 of method 200, the classifier layer 350 identifies a type of the action from amongst the one or more actions performed by the target based on the set of features. In an embodiment, the spatial features and temporal features (in the form of time-window-wise spike counts) from CSNN layer corresponding to respective actions are input to the classifier layer. In an example embodiment, the classifier layer may be implemented in a simple logistic regression-based classifier.

The classifier layer 350 is pretrained on a training data using an unsupervised training technique. Training the classifier layer for identifying a plurality of actions using the training data includes receiving, by the preprocessing layer, the training data acquired by the one or more radar sensors. The training data is indicative of the plurality of actions performed by one or more targets. The training data includes a time-series data comprising a plurality of Doppler frequencies reflected from the plurality of targets upon motion of the plurality of target with respect to the one or more radar sensors. The preprocessing layer determines a second binarized matrix associated with the training data by using a method as described earlier with reference to FIG. 6. For example, the preprocessing layer computes a plurality of spectrograms for the plurality of actions as a time-frequency domain representation of the time series by using a STFT model. The preprocessing layer further performs a modulus operation on the STFT matrix to obtain a real valued matrix, and consecutively converts the real matrix into a grayscale image and into a binary matrix using a threshold. In an example embodiment, the threshold may be between 0 and 1 used as a configuration parameter with values between 0.2 to 0.6. During training, the at least one CSNN layer extracts a set of training features associated with the plurality of actions of the target based on the binarized matrix. The set of training features includes a second set of spatial features and a second set of temporal features. The classifier layer identifies the type of the action from amongst the one or more actions performed by the target based on the training data and the second set of features.

Herein, it should be understood that the terminology 'first' and 'second' refers to the testing phase and training phase, respectively of the system 102 (or SSN model 300). For example, the 'first binarized matrix' and the 'second binarized matrix' refers to the binarized matrix associated with the testing and training phases respectively. Similarly, the terms such as the set of features, the first set of spatial features and the first set of temporal features refers to the features extracted during the testing phase while the set of training features, the second set of spatial features and the second set of temporal features refers to the features extracted during the training phase. The terminology 'first' and 'second' are solely used for the purpose of differentiating between the testing phase and training phase and are not intended to limit the embodiments in any manner. It should also be understood that first the system is trained for recognizing actions of targets by using the training data, and thereafter the system is utilized for testing of actions of the targets. An example computer system implementing the disclosed SNN model is described further with reference to FIG. 9 below.

Figure 9:
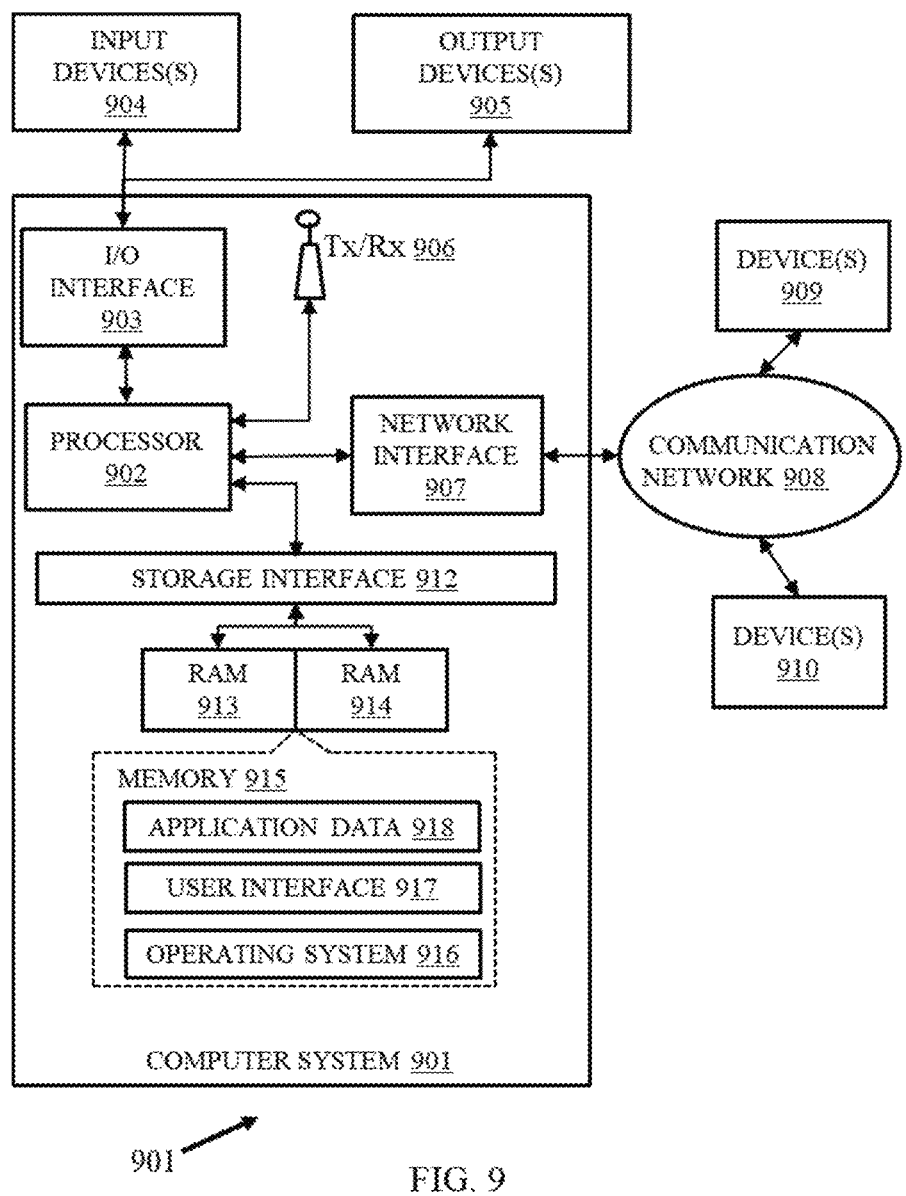
FIG. 9 illustrates a block diagram of an exemplary computer system for implementing embodiments consistent with the present disclosure.

FIG. 9 is a block diagram of an exemplary computer system 901 for implementing embodiments consistent with the present disclosure. The computer system 901 may be implemented in alone or in combination of components of the system 102 (FIG. 1). Variations of computer system 901 may be used for implementing the devices included in this disclosure. Computer system 901 may comprise a central processing unit ("CPU" or "hardware processor") 902. The hardware processor 902 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 902 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 909 and 910. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.) via a storage interface 912. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 916, user interface application 917, user/application data 918 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 901 may store user/application data 318, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

In a practical implementation of the disclosed system, the type of the action identified by the classifier layer can be utilized in applications such as monitoring, surveillance, health-care and so on. An example of monitoring may be elderly care, wherein elderly people living alone can be monitored for various bodily movements thereof to determine if their actions. In health-care services, for instance, the disclosed system can be utilized to determine whether or not the actions (such as walking, standing, sitting, lifting arm and so on) of a human being post-surgery corresponds to appropriate actions. An example scenario illustrating implementation of the disclosed system is described further in the description below.

Example Scenario

In an example scenario, the disclosed system, for example the system 102 (of FIG. 1) or the SNN model 300 of FIG. 3 was trained for performing action recognition for actions of a target, such as a human being. For the purpose of example and experimentation, 5 people were asked to perform 8 actions, each 10 times. Subjects stood at 2 meter away from the radar sensor. The experimentation was done on 3 males and 2 females. 24 GHz Quadrature channel CW radar, along with NI DAQ USB 6001 and LabView 2016 were used to collect data.

Actions performed in front of the radar sensor includes—
1) Bow with upper torso, 2) Slide right hand horizontally, 3) Kick with right leg, 4) Front foot batting with a cricket bat, 5) Ball throwing, 6) Wearing & removing glasses, 7) Sit up, and 8) Jump.

The data captured by the system was cleaned using the pre-processing module algorithm in Matlab and fed into SNN. The network described previously in FIG. 3 is implemented using BindsNet™ 0.2.4, a GPU based open source SNN simulator in Python. BindsNet™ is used because it supports parallel computing unlike other available simulators like Brian, Nest, and so on. Table II below summarizes the parameters used for implementation of the neuron model and learning mechanism.

TABLE II

| Parameter | Value | Parameter | Value |
| --- | --- | --- | --- |
| $V_{thresh\text{-}static}$ | −55.0 mV | $V_{rest}$ | −65.0 mV |
| $\tau$ | 100 ms | $\tau_\theta$ | $10^{7\ ms}$ |
| $\tau_{pre}$ | 3 ms | $\tau_{post}$ | 5 ms |
| $\eta_{dep}$ | $10^{-3}$ | $\eta_{pot}$ | $5 \times 10^{-3}$ |

Many of these parameters are consistent with the values of their biological counterparts. Also, the learning rate parameters $\eta_{dep}$ and $\eta_{pot}$ (as in Eqns. 8 and 9) were set to those values so that CSNN layer can learn features best. Value of $E_{exc}$ and $E_{inh}$ (as in Eqn. 3) were kept same as $V_{rest}$. Also, value of $\tau_e$ and $\tau_i$ (as in Eqns. 4 and 5) have been kept same as that of $\tau$.

Entire pipeline is used to train and classify on binarized radar spectrograms of aforesaid dataset. The dataset is split into a ratio of 4:1 for training and testing. All the 1-D binary images (aka vectors), also referred as spike-frames, corresponding to an action were fed into the CSNN layer sequentially. By varying the stride length of the sliding window (of size w=1, h=5) on the input spike-frame, three different experiments E1, E2, and E3 were conducted with stride length(s) being 3, 5 and 7 respectively.

Width of sliding window was taken as 1 so that we do not loose time resolution. These experiments were performed in order to find the highest classification accuracy that can be achieved by processing the least amount of data. Lesser amount of data excites lesser number of spiking neurons and consequently lesser computation effort may be required thus reducing power consumption. Detailed results of the experiments are provided in Table III.

TABLE III

Effect of stride length (s) on Precision & Recall

| Experiment | Metrices | Bow | Hand slide | Kick | Bat | Throw | Wear glasses | Sit up | Jump | Accuracy |
| --- | --- | --- | --- | --- | --- | --- | --- | --- | --- | --- |
| E1(h = 5, | Precision | 0.9 | 0.8 | 0.9 | 1.0 | 0.7 | 1.0 | 0.6 | 0.9 | 85% |
| s = 3) | Recall | 0.82 | 0.73 | 1.0 | 1.0 | 0.78 | 0.91 | 0.75 | 0.82 | |
| E2(h = 5, | Precision | 1.0 | 0.8 | 0.8 | 1.0 | 0.7 | 0.9 | 0.6 | 1.0 | 85% |
| s = 5) | Recall | 0.83 | 0.63 | 1.0 | 1.0 | 0.88 | 0.82 | 0.75 | 0.83 | |
| E3(h = 5, | Precision | 0.9 | 0.7 | 0.9 | 1.0 | 0.7 | 0.9 | 0.6 | 0.8 | 81.25% |
| s = 7) | Recall | 0.64 | 0.78 | 1.0 | 1.0 | 0.78 | 0.82 | 0.75 | 0.8 | |

It can be observed that, E1 and E2 have the same classification accuracy (85%) while it decreases to 81.25% for E3. For the stride length 3, the disclosed system processes almost 66% more data per spike-frame compared to the case with stride length 5, however the accuracy remains same. When stride length is 7, 27% less data is processed but accuracy drops. Thus, it can be concluded that, for binarized spectrograms, one cannot afford to loose further information than is already lost during the pre-processing stage. For action recognition, Precision and Recall values for each action are important to look at. As can be seen from Table III, action specific recall values and precision shows slight variation for different stride lengths—highest values obtained for both being 1, lowest being 0.6 (precision) for Sit Up and 0.64 (Recall) for Bow.

As loosing data in frequency domain (Y-axis of spectrogram) is not desirable, it was to be investigated whether the same could be done in time domain (X-axis of spectrogram). Based on experiment E2 mentioned above, it was further investigated on the effect of down-sampling of data in time domain on accuracy. Down-sampling of data essentially means reducing simulation time (aka training time) for the spiking network (SNN) thus reducing time and data to learn. As shown in Table V, down-sampling of data results in quick loss of accuracy.

TABLE V

Effect of down-sampling the radar data on classification

| Down sampling Factor | Accuracy |
| --- | --- |
| ½ | 71.25% |
| ⅝ | 77.5% |

TABLE V-continued

Effect of down-sampling the radar data on classification

| Down sampling Factor | Accuracy |
|---|---|
| 3/4 | 75% |
| 7/8 | 77.5% |
| 1 | 85% |

Hence, the experimental set up of E2 was utilized without any down-sampling for arriving at the final results. The final results are presented in the form of a confusion matrix (refer Table IV).

TABLE IV

Test results: Confusion matrix

| | Predicted | | | | | | | | | |
|---|---|---|---|---|---|---|---|---|---|---|
| Action Class | Bow | Hand slide | Kick | Bat | Throw | Wear glasses | Sit Up | Jump | Precision | Recall |
| Bow | 10 | 0 | 0 | 0 | 0 | 0 | 0 | 0 | 1 | 0.83 |
| Hand slide | 0 | 8 | 0 | 0 | 1 | 1 | 0 | 0 | 0.8 | 0.73 |
| Kick | 0 | 0 | 8 | 0 | 0 | 1 | 1 | 0 | 0.8 | 1 |
| Bat | 0 | 0 | 0 | 10 | 0 | 0 | 0 | 0 | 1 | 1 |
| Throw | 0 | 2 | 0 | 0 | 7 | 0 | 1 | 0 | 0.7 | 0.88 |
| Wear glasses | 0 | 1 | 0 | 0 | 0 | 9 | 0 | 0 | 0.9 | 0.82 |
| Sit Up | 2 | 0 | 0 | 0 | 0 | 0 | 6 | 2 | 0.6 | 0.75 |
| Jump | 0 | 0 | 0 | 0 | 0 | 0 | 0 | 10 | 1 | 0.83 |

While the action classes Bow, Bat and Jump were correctly classified with precision 1, highest recall values have been obtained for action classes Bat and Kick. Average precision obtained for all classes in 0.85 with a standard deviation of 0.15 while those values for recall is 0.86 and 0.1 respectively. It is to be noted that instances of Hand slide and Throw have been misclassified between themselves: 2 instances of Throw were classified as Hand slide and 1 instance of Hand slide as Throw. This can be explained as a result of overlapping in these two actions with respect to radar owing to the fact that CW radar recognizes object speeds towards and away from it, making their spatial signature partially similar. Worst result is obtained for Sit up with precision and recall values being 0.6 and 0.75 respectively. 2 instances of Sit ups have been classified as Bow and another 2 as Jump. These misclassifications are the results of very similar upper and lower torso movements in all the three actions.

As is seen from the experimental scenario, using SNN with experimental set up of E2), 8 human action actions performed in front of radar were distinctly classified with acceptable accuracy of 85%. In a comparative analysis, the accuracy obtained on radar spectrogram data using computationally intensive deep learning techniques like auto-encoder is ~90%. If logistic regression technique is tried on same binarized image data, an accuracy of 81.25% is achieved but computation cost and training time of logistic regression is higher compared to SNN. Thus, SNN appears to be a more suitable candidate for learning and classifying radar data and can exploit the evolving neuromorphic edge devices.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclose method and system for recognition of actions of targets using radar data in an efficient manner. For example, the disclosed system utilizes spiking neural network to classify human actions as captured by using radar sensors. The system utilizes neuromorphic concept and SNN, making it deployable over a neuromorphic edge attached to the radar so that the data need not be sent over the network for inferencing, thereby decreasing the inference latency.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for real-time radar based recognition of an action performed by a target by employing a spiking neural network (SNN) model, the method comprising:
receiving, by a data preprocessing layer of a spiking neural network (SNN), radar data acquired by one or more radar sensors, wherein the radar data is indicative of one or more actions performed by the target, wherein the radar data comprises a plurality of Doppler frequencies reflected from the target upon motion of the target with respect to the one or more radar sensors, wherein the spiking neural network (SNN) model is employed for real-time radar based recognition of an action performed by a target, the SNN model comprising a data pre-processing layer, a plurality of Convolutional Spiking neural network (CSNN) layers and a classifier layer;
determining, by the data preprocessing layer, a first binarized matrix associated with the radar data;
extracting, by the plurality of CSNN layers pre-trained on training data, a set of features associated with the one or more actions of the target based on the first binarized matrix, the set of features comprising a first set of spatial features and a first set of temporal features, wherein each CSNN layer of the plurality of CSNN layers comprises a set of class-wise filter-blocks connected via a lateral inhibition mechanism, which forms a convolutional spiking layer that takes the preprocessed radar data as input, wherein each class-wise filter-block of the set of class-wise filter-blocks comprises a set of filters controlled by a switcher node to enable each CSNN layer of the plurality of CSNN layers to capture spatially collocated patterns within a spike frame of a single action class associated with the action, wherein the switcher node applies inhibition to force all but one filter in the each class-wise filter-block to an inactive state for a predetermined inactivity duration, wherein the predetermined inactivity duration depends on strength of inhibition, wherein the spike frame is a 1-D binary image binarized radar spectrogram representing an action, wherein each pixel within the spike frame is connected to a single neuron of the class-wise filter-block;
extracting the first set of spatial features hierarchically by convolving over the plurality of CSNN layers, wherein convolving over the plurality of CSNN layers increases complexity in the first set of spatial features from an initial CSNN layer to a last CSNN layer of the plurality of CSNN layers;
wherein convolving over the plurality of CSNN layers comprises iteratively selecting a filter from amongst the set of filters to cause a spike upon an elapse of the predetermined inactivity duration thereby enabling the spatially collocated but temporally separable features to appear on distinct filters from the set of filters, wherein a filter from amongst the set of filters causing a maximum spike is selected, and wherein iteratively selecting the filter of the set of filters comprises:
activating a class-wise filter-block from amongst the set of class-wise filter-blocks at a time for a frame sequence associated with the action; and
applying a long-term inhibition to disable more than one class-wise filter-blocks from amongst the set of class-wise filter-blocks to learn a redundant pattern and enable lateral inhibition among the set of class-wise filter-blocks and allowing the set of class-wise filter-blocks to compete for a plurality of action classes, wherein applying the long-term inhibition comprises:
initializing weights associated with the filters in the set of class-wise filter-blocks randomly;
determining a class-wise filter-block from amongst the set of class-wise filter-blocks selected for a distinct action class from amongst the plurality of action classes; and
sending an inhibition signal to remaining class-wise filter-blocks from amongst the set of class-wise filter-blocks to prevent the remaining class-wise filter-blocks from being activated; and
identifying, by the classifier layer, a type of the action from amongst the one or more actions performed by the target based on the set of features, wherein the spatial features and the temporal features from the CSNN layer corresponding to respective actions is taken as an input to the classifier layer,
using the type of action identified by the classifier layer in at least one of monitoring, surveillance and healthcare applications, wherein the plurality of CSNN layers are trained using an unsupervised training technique for identifying the plurality of actions using the training data, wherein training the plurality of CSNN layers comprises:
receiving, by the data preprocessing layer, the training data acquired by the one or more radar sensors, the training data indicative of the plurality of actions performed by one or more targets, wherein the training data comprises time series data comprising a plurality of Doppler frequencies reflected from the plurality of targets upon motion of the plurality of targets with respect to the one or more radar sensors;
determining a plurality of second binarized matrices associated with each of the plurality of actions by the preprocessing layer, wherein determining the plurality of second binarized matrices comprises:
computing a plurality of spectrograms for the plurality of actions as a time-frequency domain representation of the time series data by using a Short-time Fourier Transform (STFT) model;
performing a modulus operation on the STFT model to obtain a real valued matrix;
consecutively converting the real matrix into a grayscale image into a second binary matrix of the plurality of second binary matrices using a threshold;
extracting, by the plurality CSNN layers, a set of training features associated with the plurality of actions of the target based on the second plurality of binarized matrices, the set of training features comprising a second set of spatial features and a second set of temporal features; and identifying, by the classifier layer, a type of the action from amongst the plurality of actions performed by the target based on the second set of features.

2. The method of claim 1, wherein determining the first binarized matrix comprises:
 transforming the radar data to obtain an input spectrogram using a Short-time Fourier Transform (STFT) model; and
 performing a greyscale conversion and binarization of the input spectrogram to obtain the first binarized matrix.

3. The method of claim 1, wherein a radar sensor from amongst the one or more radar sensors comprises a Continuous Wave (CW) type radar sensor.

4. The method of claim 1, wherein a radar sensor from amongst the one or more radar sensors comprises a frequency modulated continuous wave (FMCW) type radar sensor.

5. A system for real-time radar based recognition of an action performed by a target by employing a spiking neural network (SNN) model, the system, comprising:
 one or more memories; and
 one or more hardware processors, the one or more memories coupled to the one or more hardware processors, wherein the one or more hardware processors are configured to execute programmed instructions stored in the one or more memories, to:
  receive, by a data preprocessing layer of a spiking neural network (SNN), radar data acquired by one or more radar sensors, the radar data is indicative of one or more actions performed by the target, wherein the radar data comprises a plurality of Doppler frequencies reflected from the target upon motion of the target with respect to the one or more radar sensors, wherein the spiking neural network (SNN) model is employed for real-time radar based recognition of an action performed by a target, the SNN model comprising a data pre-processing layer, a plurality of Convolutional Spiking neural network (CSNN) layers and a classifier layer;
  determine, by the data preprocessing layer, a first binarized matrix associated with the radar data;
  extract, by the plurality of CSNN layers pre-trained on training data, a set of features associated with the one or more actions of the target based on the first binarized matrix, the set of features comprising a first set of spatial features and a first set of temporal features, wherein each CSNN layer of the plurality of CSNN layers comprises a set of class-wise filter-blocks connected via a lateral inhibition mechanism, which forms a convolutional spiking layer that takes the preprocessed radar data as input, wherein each class-wise filter-block of the set of class-wise filter-blocks comprises a set of filters controlled by a switcher node to enable each CSNN layer of the plurality of CSNN layers to capture spatially collocated patterns within a spike frame of a single action class associated with the action, wherein the switcher node applies inhibition to force all but one filter in each class-wise filter-block to an inactive state for a predetermined inactivity duration, wherein the predetermined inactivity duration depends on strength of inhibition, wherein the spike frame is a 1-D binary image binarized radar spectrogram representing an action, wherein each pixel within the spike frame is connected to a single neuron of the class-wise filter-block;
  extract the first set of spatial features hierarchically by convolving over the plurality of CSNN layers, wherein convolving over the plurality of CSNN layers increases complexity in the first set of spatial features from an initial CSNN layer to a last CSNN layer of the plurality of CSNN layers;
  wherein convolving over the plurality of CSNN layers comprises iteratively selecting a filter from amongst the set of filters to cause a spike upon an elapse of the predetermined inactivity duration thereby enabling the spatially collocated but temporally separable features to appear on distinct filters from the set of filters, wherein a filter from amongst the set of filters causing a maximum spike is selected, and wherein iteratively selecting the filter of the set of filters comprises:
   activating a class-wise filter-block from amongst the set of class-wise filter-blocks at a time for a frame sequence associated with the action; and
   applying a long-term inhibition to disable more than one class-wise filter-blocks from amongst the set of class-wise filter-blocks to learn a redundant pattern and enable lateral inhibition among the set of class-wise filter-blocks and allowing the set of class-wise filter-blocks to compete for a plurality of action classes wherein to apply the long-term inhibition, the one or more hardware processors are configured by the instructions to:
    initialize weights associated with the filters in the set of class-wise filter-blocks randomly;
    determine a class-wise filter-block from amongst the set of class-wise filter-blocks selected for a distinct action class from amongst the plurality of action classes; and
    send an inhibition signal to remaining class-wise filter-blocks from amongst the set of class-wise filter-blocks to prevent the remaining class-wise filter-blocks from being activated; and
  identify, by the classifier layer, a type of the action from amongst the one or more actions performed by the target based on the set of features, wherein the spatial features and the temporal features from the CSNN layer corresponding to respective actions is taken as an input to the classifier layer;
  use the type of action identified by the classifier in at least one of monitoring, surveillance and healthcare applications, wherein the plurality of CSNN layers are trained using an unsupervised training technique for identifying the plurality of actions using the training data, wherein training the plurality of CSNN layers comprises:
   receiving, by the data preprocessing layer, the training data acquired by the one or more radar sensors, the training data indicative of the plurality of actions performed by one or more targets, wherein the training data comprises time series data comprising a plurality of Doppler frequencies reflected from the plurality of targets upon motion of the plurality of targets with respect to the one or more radar sensors;
   determining a plurality of second binarized matrices associated with each of the plurality of actions by the preprocessing layer, wherein determining the plurality of second binarized matrices comprises:
    computing a plurality of spectrograms for the plurality of actions as a time-frequency domain representation of the time series data by using a Short-time Fourier Transform (STFT) model;

performing a modulus operation on the STFT model to obtain a real valued matrix;

consecutively converting the real matrix into a grayscale image into a second binary matrix of the plurality of second binary matrices using a threshold;

extract, by the plurality CSNN layers, a set of training features associated with the plurality of actions of the target based on the second plurality of binarized matrices, the set of training features comprising a second set of spatial features and a second set of temporal features; and identify, by the classifier layer, a type of the action from amongst the plurality of actions performed by the target based on the second set of features.

6. The system of claim 5, wherein to determining the first binarized matrix, the one or more hardware processors are configured by the instructions to:

transform the radar data to obtain an input spectrogram using a Short-time Fourier Transform (STFT) model; and perform a greyscale conversion and binarization of the input spectrogram to obtain the first binarized matrix.

7. The system of claim 5, wherein a radar sensor from amongst the one or more radar sensors comprises a Continuous Wave (CW) type radar sensor.

8. The system of claim 5, wherein a radar sensor from amongst the one or more radar sensors comprises a frequency modulated continuous wave (FMCW) type radar sensor.

9. One or more non-transitory machine readable information storage mediums comprising one or more instructions which when executed by one or more hardware processors cause:

receiving, by a data preprocessing layer of a spiking neural network (SNN), radar data acquired by one or more radar sensors, wherein the radar data is indicative of one or more actions performed by the target, wherein the radar data comprises a plurality of Doppler frequencies reflected from the target upon motion of the target with respect to the one or more radar sensors, wherein the spiking neural network (SNN) model is employed for real-time radar based recognition of an action performed by a target, the SNN model comprising a data pre-processing layer, a plurality of Convolutional Spiking neural network (CSNN) layers and a classifier layer;

determining, by the data preprocessing layer, a first binarized matrix associated with the radar data;

extracting, by the plurality of CSNN layers pre-trained on training data, a set of features associated with the one or more actions of the target based on the first binarized matrix, the set of features comprising a first set of spatial features and a first set of temporal features, wherein each CSNN layer of the plurality of CSNN layers comprises a set of class-wise filter-blocks connected via a lateral inhibition mechanism, which forms a convolutional spiking layer that takes the preprocessed radar data as input, wherein each class-wise filter-block of the set of class-wise filter-blocks comprises a set of filters controlled by a switcher node to enable each CSNN layer of the plurality of CSNN layers to capture spatially collocated patterns within a spike frame of a single action class associated with the action, wherein the switcher node applies inhibition to force all but one filter in each class-wise filter-block to an inactive state for a predetermined inactivity duration, wherein the predetermined inactivity duration depends on strength of inhibition, wherein the spike frame is a 1-D binary image binarized radar spectrogram representing an action, wherein each pixel within the spike frame is connected to a single neuron of the class-wise filter-block;

extracting the first set of spatial features hierarchically by convolving over the plurality of CSNN layers, wherein convolving over the plurality of CSNN layers increases complexity in the first set of spatial features from an initial CSNN layer to a last CSNN layer of the plurality of CSNN layers;

wherein convolving over the plurality of CSNN layers comprises iteratively selecting a filter from amongst the set of filters to cause a spike upon an elapse of the predetermined inactivity duration thereby enabling the spatially collocated but temporally separable features to appear on distinct filters from the set of filters, wherein a filter from amongst the set of filters causing a maximum spike is selected, and wherein iteratively selecting the filter of the set of filters comprises:

activating a class-wise filter-block from amongst the set of class-wise filter-blocks at a time for a frame sequence associated with the action; and applying a long-term inhibition to disable more than one class-wise filter-blocks from amongst the set of class-wise filter-blocks to learn a redundant pattern and enable lateral inhibition among the set of class-wise filter-blocks and allowing the set of class-wise filter-blocks to compete for a plurality of action classes, wherein applying the long-term inhibition comprises:

initializing weights associated with the filters in the set of class-wise filter-blocks randomly;

determining a class-wise filter-block from amongst the set of class-wise filter-blocks selected for a distinct action class from amongst the plurality of action classes; and sending an inhibition signal to remaining class-wise filter-blocks from amongst the set of class-wise filter-blocks to prevent the remaining class-wise filter-blocks from being activated; and identifying, by the classifier layer, a type of the action from amongst the one or more actions performed by the target based on the set of features, wherein the spatial features and the temporal features from the CSNN layer corresponding to respective actions is taken as an input to the classifier layer, using the type of action identified by the classifier layer in at least one of monitoring, surveillance and healthcare applications, wherein the plurality of CSNN layers are trained using an unsupervised training technique for identifying the plurality of actions using the training data, wherein training the plurality of CSNN layers comprises:

receiving, by the data preprocessing layer, the training data acquired by the one or more radar sensors, the training data indicative of the plurality of actions performed by one or more targets, wherein the training data comprises time series data comprising a plurality of Doppler frequencies reflected from the plurality of targets upon motion of the plurality of targets with respect to the one or more radar sensors;

determining a plurality of second binarized matrices associated with each of the plurality of actions by the preprocessing layer, wherein determining the plurality of second binarized matrices comprises:
computing a plurality of spectrograms for the plurality of actions as a time-frequency domain representation of the time series data by using a Short-time Fourier Transform (STFT) model;
performing a modulus operation on the STFT model to obtain a real valued matrix;
consecutively converting the real matrix into a grayscale image into a second binary matrix of the plurality of second binary matrices using a threshold;
extracting, by the plurality CSNN layers, a set of training features associated with the plurality of actions of the target based on the second plurality of binarized matrices, the set of training features comprising a second set of spatial features and a second set of temporal features; and
identifying, by the classifier layer, a type of the action from amongst the plurality of actions performed by the target based on the second set of features.

* * * * *